(12) United States Patent
Buchon

(10) Patent No.: US 7,727,427 B2
(45) Date of Patent: Jun. 1, 2010

(54) METHOD OF FABRICATING A LIGHT DUCT OF THERMOPLASTIC MATERIAL

(75) Inventor: Cedric Buchon, Charenton (FR)

(73) Assignee: Essilor International, Charenton (FR)

(*) Notice: Subject to any disclaimer, the term of this patent is extended or adjusted under 35 U.S.C. 154(b) by 561 days.

(21) Appl. No.: 10/583,487

(22) PCT Filed: Nov. 2, 2004

(86) PCT No.: PCT/FR2004/050555

§ 371 (c)(1),
(2), (4) Date: Jun. 7, 2007

(87) PCT Pub. No.: WO2005/063474

PCT Pub. Date: Jul. 14, 2005

(65) Prior Publication Data

US 2007/0253071 A1    Nov. 1, 2007

(30) Foreign Application Priority Data

Dec. 24, 2003    (FR) .................................. 03 51207

(51) Int. Cl.
*B29D 12/00*    (2006.01)
(52) U.S. Cl. ................ 264/1.1; 264/328.12; 264/328.1; 264/1.24

(58) Field of Classification Search ................ 264/319, 264/328.1, 330, 331.11, 328.12, 328.7, 1.1; 359/630
See application file for complete search history.

(56) References Cited

U.S. PATENT DOCUMENTS

| | | | | |
|---|---|---|---|---|
| 4,778,632 A * | 10/1988 | Bakalar | ...................... | 264/2.2 |
| 5,415,817 A * | 5/1995 | Shiao et al. | .................. | 264/2.2 |
| 6,023,372 A * | 2/2000 | Spitzer et al. | ............... | 359/630 |
| 6,356,392 B1 * | 3/2002 | Spitzer | ........................ | 359/630 |
| 2002/0091174 A1 * | 7/2002 | Soane et al. | ................. | 523/106 |

FOREIGN PATENT DOCUMENTS

WO    WO0079329    12/2000

OTHER PUBLICATIONS

PCT Search Report- Mar. 30, 2005.

* cited by examiner

*Primary Examiner*—Khanh Nguyen
*Assistant Examiner*—Vishal I Patel
(74) *Attorney, Agent, or Firm*—Sofer & Haroun, LLP

(57) ABSTRACT

A method of fabricating a light duct includes making the light duct as a single piece by injection molding a thermoplastic material in a mold (1) presenting a cavity of shape identical to that of the duct, the injection taking place through a feed orifice disposed on one side of said cavity over a face that is substantially parallel to the plane defined by axes (A-A', B-B'), the feed orifice presenting a height h lying in the range 0.2 $H_{max}$ and $H_{max}$, and a length l lying in the range 0.2 $L_{moy}$ and 0.8 $L_{moy}$, the thermoplastic material being injected at a rate lying in the range 400 mm³/s to 1500 mm³/s.

13 Claims, 2 Drawing Sheets

METHOD OF FABRICATING A LIGHT DUCT OF THERMOPLASTIC MATERIAL

RELATED APPLICATIONS

The present application is a national phase application of PCT/FR2004/050555, which in turn claims the benefit of priority from French Patent Application No. 03 51 207, filed on Dec. 24, 2003, the entirety of which are incorporated herein by reference.

FIELD OF THE INVENTION

The present invention relates to a method of fabricating a light duct of thermoplastic material that is intended in particular for use in making an electronic display arrangement mounted on a frame of the pair of spectacles type.

BACKGROUND OF THE INVENTION

Such a display arrangement is described in U.S. Pat. No. 6,023,372 and is shown in plan view in FIG. 1.

Such an arrangement 10 comprises a housing assembly 16 having a first enclosure 20 containing a circuit for receiving data or images and containing an imaging assembly. The light transmitted by the imaging assembly is relayed via an optical device 14 to the eye of the user, e.g. through a spectacle lens 24. This light duct 14 comprises a transparent rectilinear light relay 26 conveying light along its longitudinal axis A-A', and a deflector assembly 28 comprising a mirror 30 placed on a surface that is inclined relative to the first axis A-A' and an aspherical lens 32 whose axis of revolution B-B' is, in this example, perpendicular to the first axis A-A', and is disposed in register with said inclined wall. The housing assembly 16 is mounted on a temple 34 of the spectacle frame by a clamping assembly 36.

The duct presents a given maximum height $H_{max}$ beyond the thickness of the lens, and a given mean length $L_{moy}$ along its longitudinal axis A-A'. By way of example, such a prior art light duct presents a maximum height $H_{max}$ of 11 millimeters (mm) and a mean length $L_{moy}$ of 32 mm.

It is known to fabricate the light duct 14 by sticking together a plurality of plastics parts molded out of polymethylmethacrylate (PMMA), or out of "Zeonex" (a cyclo-olefin polymer). These various parts include the light relay 26 which is made by cutting a rectangular section bar out of a plate and then machining and polishing it at its ends, the bar also serving to carry the mirror 30 and the likewise-molded lens 32 which are bonded thereto by adhesive.

Such a method of fabrication is complex since it includes numerous steps of processing, cutting, machining, polishing, and bonding that require very great precision throughout those steps. It is consequently lengthy and expensive.

OBJECTS AND SUMMARY OF THE INVENTION

The invention solves this problem by a method of fabrication that is simple and fast, and more suitable for mass production, while ensuring light transmission of good quality by ensuring excellent uniformity of its constituent material, thereby serving to avoid any deformation of the transmitted image.

To do this, the invention provides a method of fabricating a light duct of thermoplastic material, the duct comprising a light relay constituted by a rectangular section bar for conveying light along its longitudinal axis referred to as a "first" axis, and provided at one of its ends both with a wall that is inclined relative to said first axis, and with a lens, the axis of revolution of the lens being contained in a longitudinal plane of symmetry, said duct presenting a given maximum height $H_{max}$ beyond the thickness of the lens and a given mean length $L_{moy}$ along its longitudinal axis, the duct being characterized in that it is made as a single piece by injection molding said thermoplastic material in a mold presenting a cavity of shape identical to that of the duct, the injection taking place through a feed orifice disposed on one side of said cavity over a face that is substantially parallel to the plane defined by said axes, said feed orifice presenting a height h lying in the range 0.2 $H_{max}$ and $H_{max}$, and a length l lying in the range 0.2 $L_{moy}$ and 0.8 $L_{moy}$, the thermoplastic material being injected at a rate lying in the range 400 cubic millimeters per second (mm³/s) to 1500 mm³/s.

By means of these characteristics, it is ensured that the material within the molded light duct is uniform, thus enabling light to be transmitted well. The refractive index y is uniform, thereby eliminating any chromatic aberration or deformation of the transmitted image.

In a preferred embodiment, said height h of said feed orifice is equal to 0.8 $H_{max}$ and said length l of said feed orifice is equal to 0.8 $L_{moy}$.

Preferably, said rate is equal to 725 mm³/s.

Advantageously, said mold is maintained at a temperature regulated in the range 70° C. to 90° C.

Advantageously, said mold includes a lateral overflow orifice symmetrical to said feed orifice relative to the plane defined by said axes.

Preferably, said mold is extended by a first auxiliary mold portion of substantially rectangular section and of outlet corresponding to said feed orifice.

And advantageously, said mold is extended by an overflow second auxiliary mold portion of substantially rectangular section, and of inlet corresponding to said lateral overflow orifice.

According to another characteristic, the method of the invention includes a compacting and holding step applied to the injected material.

The function of this step is to compensate for the variation in specific volume that occurs during cooling, by adding additional molten material.

Said compacting and holding step may be performed in stages.

Said thermoplastic material may be "Zeonex" or PMMA.

When using PMMA, it is preferably injected at a temperature of about 220° C. and at a rate of substantially 725 mm³/s, and is then compacted at 58 megapascals (MPa).

Preferably, the PMMA is compacted after injection at 43 MPa for 1 second (s), then at 46 MPa for 2 s, then at 50 MPa for 3 s, and finally at 58 MPa for 40 s, and its cooling time in the mold is then 150 s.

The invention also provides an electronic display arrangement suitable for mounting on a frame of the pair of spectacles type or on a specific system for positioning in front of the eyes of a user, the arrangement including at least one light duct fabricated using the above-specified method.

BRIEF DESCRIPTION OF THE DRAWINGS

The invention is described below in detail with reference to the figures that merely show a preferred embodiment of the invention.

DETAILED DESCRIPTION

Figure 1:
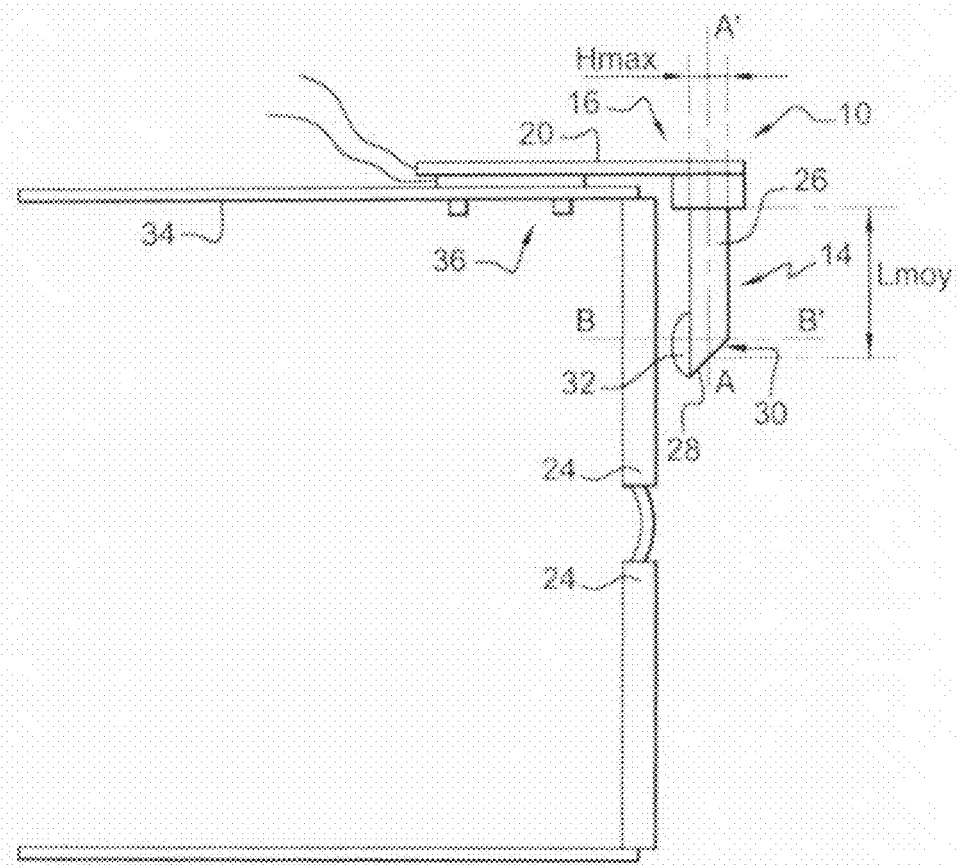
FIG. 1 is a view from above of a prior art electronic display arrangement mounted on a frame of the pair of spectacles type, and it is described above.

FIG. 1 shows an embodiment of the light duct and it also shows one way of mounting said duct, in this example on a frame of the pair of spectacles type.

In the context of the invention, the light duct 14 could be slightly different. In particular, the axis of revolution B-B' of the lens need not be perpendicular to the first axis A-A', but could be inclined at an angle lying in the range 75° to 90° relative to said axis. This makes it possible to adapt the ergonomics of the light duct once mounted, so that it fits more closely to the shape of the user's face.

Furthermore, the duct may also be mounted on a specific system that is placed in front of the eyes of a user, other than a spectacle frame.

Figure 2:
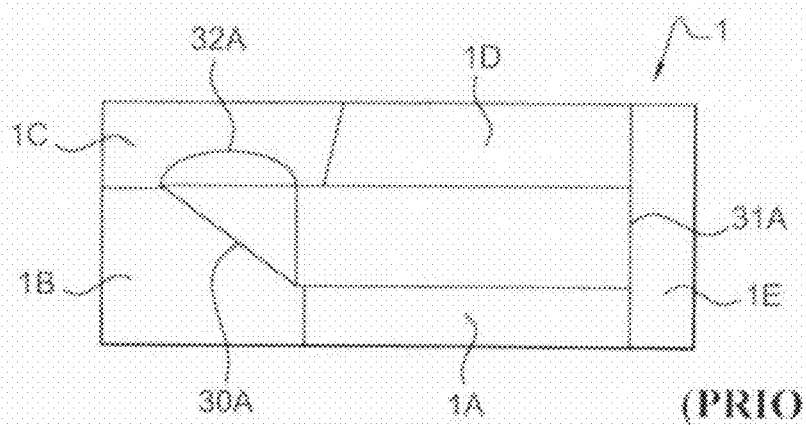
FIG. 2 is a longitudinal section view through a mold used in the method in accordance with the invention.

In the method in accordance with the invention, a mold 1 is used that is made up of a plurality of portions or inserts, as shown in FIG. 2. One insert is used per face of the duct that is to be fabricated.

More precisely, the mold has five inserts 1A to 1E with the inserts 1B, 1C, and 1E corresponding to the active optical faces constituted by the surface of the lens 32A, the inclined surface carrying the mirror 30A, and the relay front surface 31A, referred to as the inlet window. These inserts are made of beryllium steel so as to ensure that optically perfect faces are molded.

The mold itself is not described in greater detail below, since it comes within the competence of the person skilled in the art.

The method in accordance with the invention is described with reference to FIG. 3 that shows the resulting molding. From this view of the molding, the person skilled in the art can deduce in obvious manner the corresponding mold and inserts.

According to the invention, the duct is made as a single piece by injecting a thermoplastic material into the mold presenting a cavity of shape identical to that of the duct, with injection taking place through a feed orifice disposed laterally relative to the cavity on a face that is substantially parallel to the plane defined by the axes A-A', B-B', said feed orifice presenting a height h lying in the range $0.2\ H_{max}$ and $H_{max}$, and a length l lying in the range $0.2\ L_{moy}$ to $L_{moy}$, and the thermoplastic material is injected at a rate lying in the range 400 mm$^3$/s to 1500 mm$^3$/s.

In a preferred implementation, the height h of the feed orifice is equal to $0.8\ H_{max}$, the length l of the feed orifice is equal to $0.8\ L_{moy}$ and the flow rate is equal to 725 mm$^3$/s.

The mold 1 is maintained at a temperature regulated in the range 70° C. to 90° C.

To provide this feed orifice, the mold is extended by a first auxiliary molding piece that is substantially rectangular in section, having an outlet corresponding to said feed orifice and leading to a corresponding molding 40 that constitutes a rectangular block on one side of the duct 14. An injection well delivers material into the mold, and the molding 41 corresponding to the well extends perpendicularly to the longitudinal axis A-A'.

The mold also has a lateral overflow orifice symmetrical to the feed orifice relative to the plane defined by said axes A-A' and B-B'. More precisely, the mold is extended by an overflow second auxiliary mold portion of substantially rectangular section having its inlet corresponding to said lateral overflow orifice. The corresponding molding 42 is a lateral rectangular block disposed on the other side of the duct 14.

Figure 3:
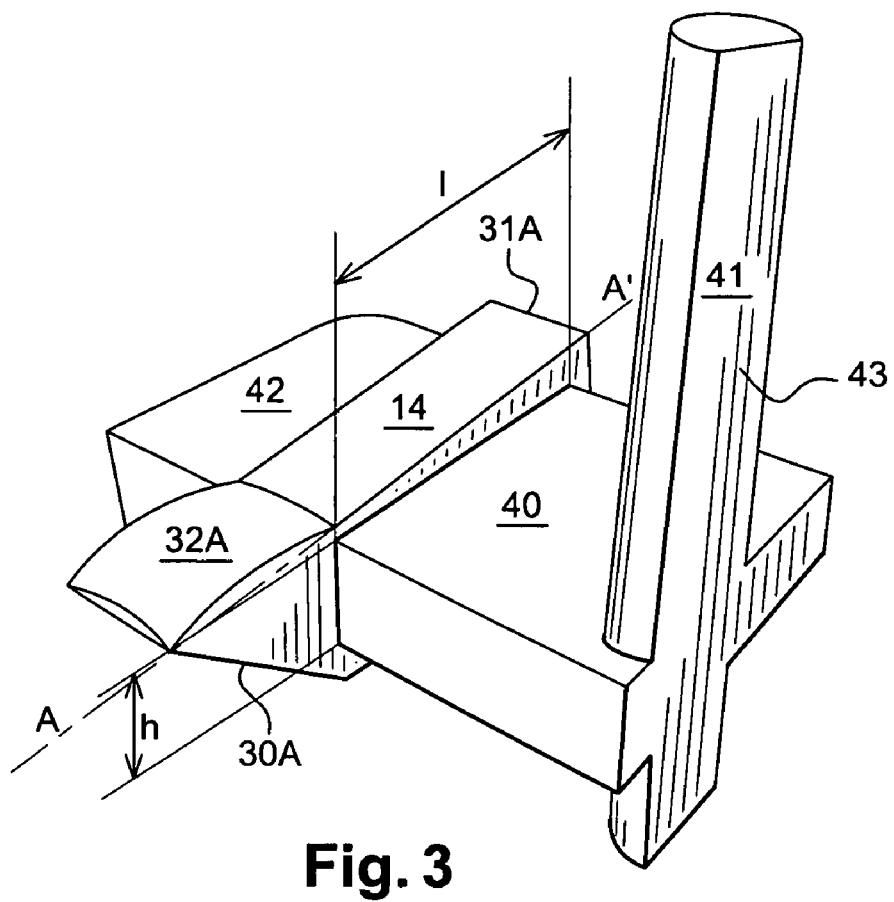
FIG. 3 is a perspective view of a molding that is to form a light duct using the method in accordance with the invention.
Figure 4:
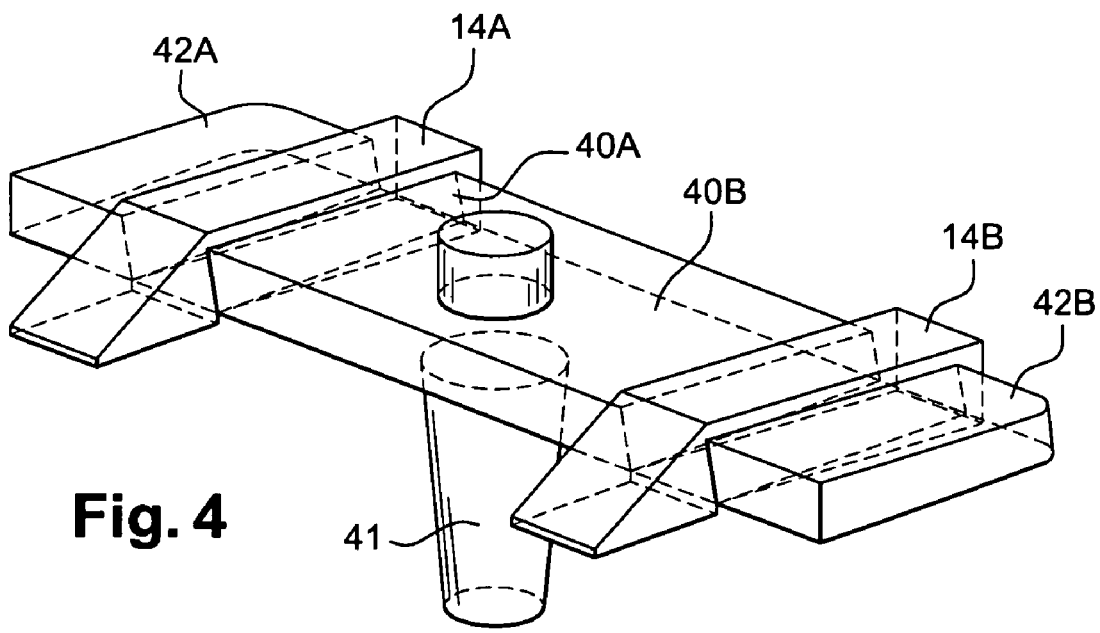
FIG. 4 is a perspective view of a molding for forming two light ducts using the method in accordance with the invention.

Advantageously a mold is used that has two recesses, in the sense that the plane 43 shown in FIG. 3 is a plane of symmetry of the mold as a whole. The molding corresponding to the entire mold is shown in FIG. 4.

The semi-conical molding 41 corresponds to a single injection well. Thus, two light ducts 14A and 14B are molded from this well together with their respective auxiliary moldings 40A, 42A and 40B, 42B. The first two auxiliary injection portions thus form a common mold portion interconnecting the two cavities that are identical in shape to the ducts 14.

By way of example, the thermoplastic material may be "Zeonex" or PMMA.

A particular implementation of the method of the invention is described in greater detail below, in which the thermoplastic material used is PMMA, a material that is known for use in fabricating optical parts with good precision.

The PMMA is injected into the injection well at a temperature of 220° C. and a rate of 725 mm$^3$/s. Such a filling operation lasts for 7 s to 20 s.

The PMMA is then compacted in steps at 43 MPa for 1 s, then at 46 MPa for 2 s, then at 50 MPa for 3 s, and finally at 58 MPa for 40 s, with its cooling time in the mold subsequently being 150 s.

The resulting molding is cooled for about 10 minutes outside its mold.

The molding as shown in FIG. 4 is then cut up in order to obtain separate light ducts 14A and 14B. Mirrors are made on their inclined faces by depositing a layer of aluminum or by bonding a plane mirror-coated mineral slide. The inlet window may optionally be fitted with an anti-reflection plane side. The light duct as fabricated in this way can be surface-treated with varnish in order to enable it to withstand external aggression. In particular, its faces that are not optically active may be coated in paint in order to increase the contrast of the duct.

These two light ducts 14A and 14B are for mounting on a frame of the pair of spectacles type or on a special system for positioning in front of the eyes of a user in order to form an electronic display arrangement, e.g. of the kind shown in FIG. 1.

The invention claimed is:

1. A method of fabricating a light duct, said method comprising the steps of:
   fabricating a light duct of thermoplastic material, the duct having a light relay constituted by a rectangular section bar for conveying light along its longitudinal axis referred to as a "first" axis, and provided at one of its ends both with a wall that is inclined relative to said first axis, and with a lens, the axis of revolution of the lens being contained in a longitudinal plane of symmetry, said duct presenting a given maximum height $H_{max}$ beyond the thickness of the lens and a given mean length $L_{moy}$ along its longitudinal axis, wherein the duct is made as a single piece by injection molding, said thermoplastic material in a mold presenting a cavity of shape identical to that of the duct;
   injecting through a feed orifice disposed on one side of said cavity over a face that is substantially parallel to the plane defined by said axes, wherein said feed orifice presents a height h lying in the range $0.2\ H_{max}$ and $H_{max}$, and a length l lying in the range $0.2\ L_{moy}$ and $0.8\ L_{moy}$; and injecting the thermoplastic material at a rate lying in the range 400 mm³/s to 1500 mm³/s.

2. A method according to claim 1, wherein said height h of said feed orifice is equal to 0.8 $H_{max}$ and said length l of said feed orifice is equal to 0.8 $L_{moy}$.

3. A method according to claim 1, wherein said rate is equal to 725 mm³/s.

4. A method according to claim 1, wherein said mold is maintained at a temperature regulated in the range 70° C. to 90° C.

5. A method according to claim 1, wherein said mold includes a lateral overflow orifice symmetrical to said feed orifice relative to the plane defined by said axes.

6. A method according to claim 1, wherein said mold is extended by a first auxiliary mold portion of substantially rectangular section and of outlet corresponding to said feed orifice.

7. A method according to claims 5, wherein said mold is extended by an overflow second auxiliary mold portion of substantially rectangular section, and of inlet corresponding to said lateral overflow orifice.

8. A method according to claim 1, further including compacting and holding step applied to the injected material.

9. A method according to claim 8, wherein said compacting and holding step is performed in stages.

10. A method according to claim 1, wherein said thermoplastic material is a cyclo-olefin polymer.

11. A method according to claim 1, wherein said thermoplastic material is PMMA.

12. A method according to claim 11, wherein the PMMA is compacted at a temperature of about 220° C. and at a rate of substantially 725 mm³/s, and is then compacted at 58 MPa.

13. A method according to claim 12, wherein the PMMA is compacted after injection at 43 MPa for 1 s, then at 46 MPa for 2 s, then at 50 MPa for 3 s, and finally at 58 MPa for 40 s, and its cooling time in the mold is then 150 s.

* * * * *